United States Patent

Bolle

(10) Patent No.: US 8,593,503 B2
(45) Date of Patent: Nov. 26, 2013

(54) VIDEOCONFERENCING TERMINAL AND METHOD OF OPERATION THEREOF TO MAINTAIN EYE CONTACT

(75) Inventor: Cristian A. Bolle, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 899 days.

(21) Appl. No.: 12/238,096

(22) Filed: Sep. 25, 2008

(65) Prior Publication Data

US 2010/0073456 A1    Mar. 25, 2010

(51) Int. Cl.
*H04N 7/14* (2006.01)

(52) U.S. Cl.
USPC ..................... 348/14.08; 348/14.16

(58) Field of Classification Search
USPC .............. 348/14.16, 14.08, 14.01; 345/87, 88
See application file for complete search history.

(56) References Cited

U.S. PATENT DOCUMENTS

| | | | |
|---|---|---|---|
| 5,400,069 A | 3/1995 | Braun et al. | |
| 5,500,671 A | 3/1996 | Andersson et al. | |
| 5,666,155 A | 9/1997 | Mersereau | |
| 6,385,352 B1 | 5/2002 | Roustaei | |
| 6,567,116 B1 | 5/2003 | Aman et al. | |
| 6,710,797 B1 | 3/2004 | McNelley et al. | |
| 6,771,303 B2 | 8/2004 | Zhang et al. | |
| 6,784,916 B2 | 8/2004 | Smith | |
| 6,894,839 B2 | 5/2005 | Sugiyama et al. | |
| 6,919,907 B2 | 7/2005 | Berstis | |
| 7,034,866 B1 | 4/2006 | Colmenarez et al. | |
| 7,050,084 B1 | 5/2006 | Lang | |
| 7,057,637 B2 | 6/2006 | White | |
| 7,202,887 B2 | 4/2007 | Hillis et al. | |
| 7,209,160 B2 | 4/2007 | McNelley et al. | |
| 7,602,276 B2 | 10/2009 | Madan | |
| 7,679,639 B2 | 3/2010 | Harrell et al. | |
| 7,692,680 B2 | 4/2010 | Graham et al. | |
| 7,692,780 B2 | 4/2010 | Oomori et al. | |
| 7,710,448 B2 | 5/2010 | De Beer et al. | |
| 7,763,546 B2 | 7/2010 | Kothari et al. | |
| 7,808,450 B2 | 10/2010 | Wanda et al. | |
| 7,808,540 B2 * | 10/2010 | Cok .......................... | 348/14.16 |
| 8,063,929 B2 | 11/2011 | Kurtz et al. | |
| 8,096,660 B2 | 1/2012 | Vertegaal et al. | |
| 8,154,582 B2 | 4/2012 | Border et al. | |
| 8,223,186 B2 | 7/2012 | Derocher et al. | |
| 8,228,371 B2 | 7/2012 | Sobel et al. | |
| 8,253,770 B2 | 8/2012 | Kurtz et al. | |
| 8,264,518 B2 | 9/2012 | Khouri et al. | |
| 8,279,262 B2 | 10/2012 | Graham et al. | |
| 2003/0197779 A1 | 10/2003 | Zhang et al. | |
| 2004/0196359 A1 | 10/2004 | Blackham | |
| 2006/0007222 A1 | 1/2006 | Uy | |

(Continued)

OTHER PUBLICATIONS

M. Gross et al, "blue-c: A Spatially Immersive Display and 3D Video Portal for Telepresence", project webpage: http://bluec.ethz.ch/, ACM 0730-0301/03/0700-0819, (2003) pp. 819-827.

(Continued)

*Primary Examiner* — Stella Woo
(74) *Attorney, Agent, or Firm* — Hitt Gaines, PC

(57) ABSTRACT

A videoconferencing terminal, a method of videoconferencing and a videoconferencing infrastructure. In one embodiment, the terminal includes: (1) a flat panel display and (2) a camera associated with the flat panel display and configured to receive light from an object through the flat panel display and acquire an image of the object.

23 Claims, 6 Drawing Sheets

(56) References Cited

U.S. PATENT DOCUMENTS

| | | | |
|---|---|---|---|
| 2006/0204050 | A1 | 9/2006 | Takizawa |
| 2007/0002130 | A1 | 1/2007 | Hartkop |
| 2007/0120879 | A1* | 5/2007 | Kanade et al. ............. 346/107.2 |
| 2007/0247417 | A1 | 10/2007 | Miyazaki et al. |
| 2007/0263080 | A1 | 11/2007 | Harrell et al. |
| 2007/0273839 | A1 | 11/2007 | Doi et al. |
| 2008/0012936 | A1 | 1/2008 | White |
| 2009/0041298 | A1 | 2/2009 | Sandler et al. |
| 2009/0122572 | A1 | 5/2009 | Page et al. |
| 2009/0278913 | A1* | 11/2009 | Rosenfeld et al. ......... 348/14.16 |
| 2010/0073456 | A1 | 3/2010 | Bolle |
| 2010/0302343 | A1 | 12/2010 | Bolle |
| 2011/0043617 | A1 | 2/2011 | Vertegaal et al. |
| 2011/0102538 | A1 | 5/2011 | Tan |
| 2011/0137693 | A1 | 6/2011 | Mattimore et al. |
| 2011/0149012 | A1 | 6/2011 | Bolle et al. |
| 2012/0040490 | A1 | 2/2012 | Gallazzo et al. |

OTHER PUBLICATIONS

M. Kuechler et al, "HoloPort—A Device for Simultaneous Video and Data Conferencing Featuring Gaze Awareness", In Proceedings of the 2006 IEEE Virtual Reality Conference (VR '06), (2006), pp. 81-87.

S. Iizadi et al, "Going Beyond the Display: A Surface Technology with an Electronically Switchable Diffuser", UIST '08, (Oct. 19-22, 2008), Monterey, CA, pp. 269-278.

H. Ishii et al, "ClearBoard: A Seamless Medium for Shared Drawing and Conversation with Eye Contact", CHI '92, (May 3-7, 1992), pp. 525-532.

K-H Tan et al, "ConnectBoard: A remote collaboration system that supports gaze-aware interaction and sharing", 2009 IEEE International Workshop on Multimedia Signal Processing, MMSP '09, (Oct. 5-7, 2009), 6 pages.

S. Shiwa et al, "A Large-Screen Visual Telecommunication Device Enabling Eye Contact", SID 91 Digest, ISSN0097-0966x/91/0000-327 (1991), pp. 327-328.

C. Bolle et al, "Videoconferencing Terminal With a Persistence of Vision Display and a Method of Operation Thereof to Maintain Eye Contact", filed Dec. 17, 2009, U.S. Appl. No. 12/640,998, 36 pgs.

C. Bolle et al, "Imaging Terminal", filed Dec. 8, 2009, U.S. Appl. No. 12/633,656, 21 pages.

C. Bolle, "Videoconferencing Terminal and Method of Operation Thereof to Maintain Eye Contact", filed May 26, 2009, U.S. Appl. No. 12/472,250, 25 pages.

"Electrophoresis", http:lcp.elis.ugent.be/research/electrophoresis, Liquid Crystals & Photonics Group, Universiteit Gent (Belgium), 11 pages, Jan. 17, 2013.

"How Mirasol® Displays Work: Micro-electro-mechanical Systems (MEMS) Drive IMOD Reflective Technology", www.mirasolidisplays.com/mobile-display-imod-technology.php?, 2009 Qualcomm MEMS Technologies, Inc., 1 page, Aug. 14, 2009.

"TFT LCD Specification—Model No. PQ 3Qi-01", Doc No. P0003, Pixel Qi Corporation, Jun. 28, 2010, 23 pages.

\* cited by examiner

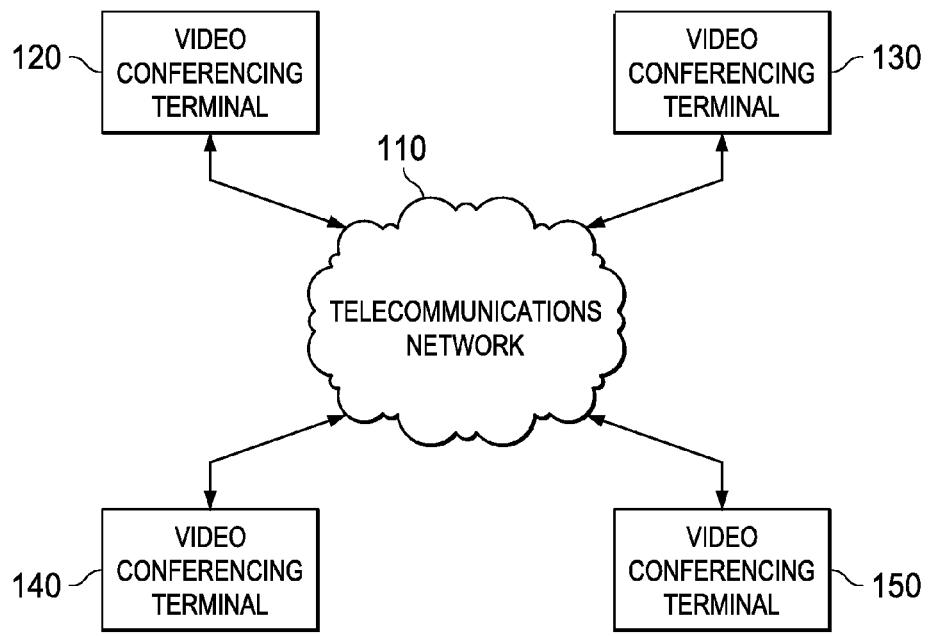
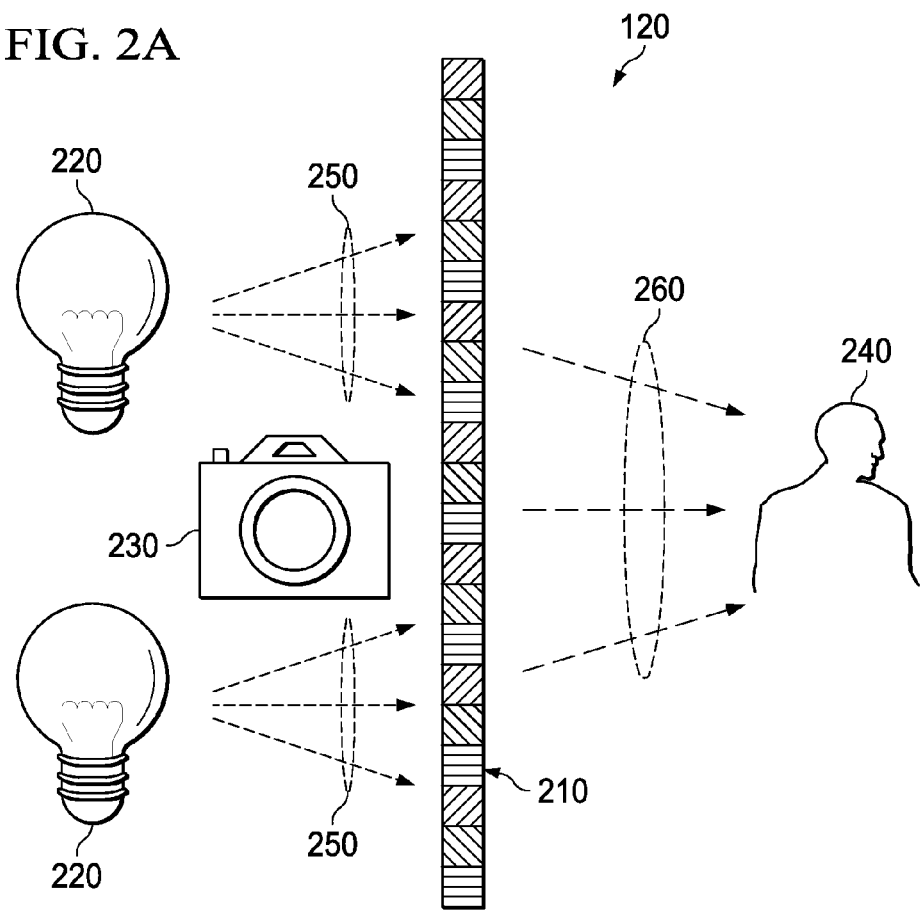

VIDEOCONFERENCING TERMINAL AND METHOD OF OPERATION THEREOF TO MAINTAIN EYE CONTACT

TECHNICAL FIELD OF THE INVENTION

The invention is directed, in general, to videoconferencing terminals and, more specifically, to a videoconferencing terminal and a method of operating the same to maintain eye contact between or among participants in a videoconference.

BACKGROUND OF THE INVENTION

Communication via computer networks frequently involves far more than transmitting text. Computer networks, such as the Internet, can also be used for audio communication and visual communication. Still images and video are examples of visual data that may be transmitted over such networks.

One or more cameras may be coupled to a personal computer (PC) to provide visual communication. The camera or cameras can then be used to transmit real-time visual information, such as video, over a computer network. A duplex transmission can be used to allow audio transmission with the video information. Whether in one-to-one communication sessions or through videoconferencing with multiple participants, participants can communicate via audio and video in real time over a computer network (i.e., voice-video communication).

The visual images transmitted during voice-video communication sessions depend on the placement of the camera or cameras. Thus, when communicating, participants are unable to look at each other "eye-to-eye" since a disparity exists between the location of the camera or cameras and the PC's display screen. More realistic voice-video communication would be beneficial.

SUMMARY OF THE INVENTION

To address the above-discussed deficiencies of the prior art, the invention provides a videoconferencing terminal. In one embodiment, the terminal includes: (1) a flat panel display (FPD) and (2) a camera associated with the EPD and configured to receive light from an object through the FPD and acquire an image of the object.

Another aspect of the invention provides a method of videoconferencing. In one embodiment, the method includes: (1) receiving light from an object through a FPD into a camera and (2) acquiring an image of the object.

Yet another aspect of the invention provides a videoconferencing infrastructure. In one embodiment, the infrastructure includes a plurality of videoconferencing terminals associable with a telecommunications network. In one embodiment, each of the terminals includes: (1) a FPD, (2) a camera associated with the FPD, (3) a microphone associated with the camera and configured to generate an audio signal based on acoustic energy received thereby, (4) a speaker associated with the camera and configured to generate acoustic energy based on an audio signal received thereby and (5) a controller coupled to the FPD and the camera and configured to control the FPD and the camera to cause the camera to receive light from an object through the FPD and acquire an image of the object.

BRIEF DESCRIPTION OF THE DRAWINGS

For a more complete understanding of the invention, reference is now made to the following descriptions taken in conjunction with the accompanying drawings, in which:

FIG. 1 is a highly schematic block diagram of one embodiment of a videoconferencing infrastructure within which a videoconferencing terminal constructed according to the principles of the invention may operate;

FIG. 2A is a schematic side elevational view of a first embodiment of a videoconferencing terminal constructed according to the principles of the invention and operating in an intermittent image display mode;

DETAILED DESCRIPTION

Figure 2B:
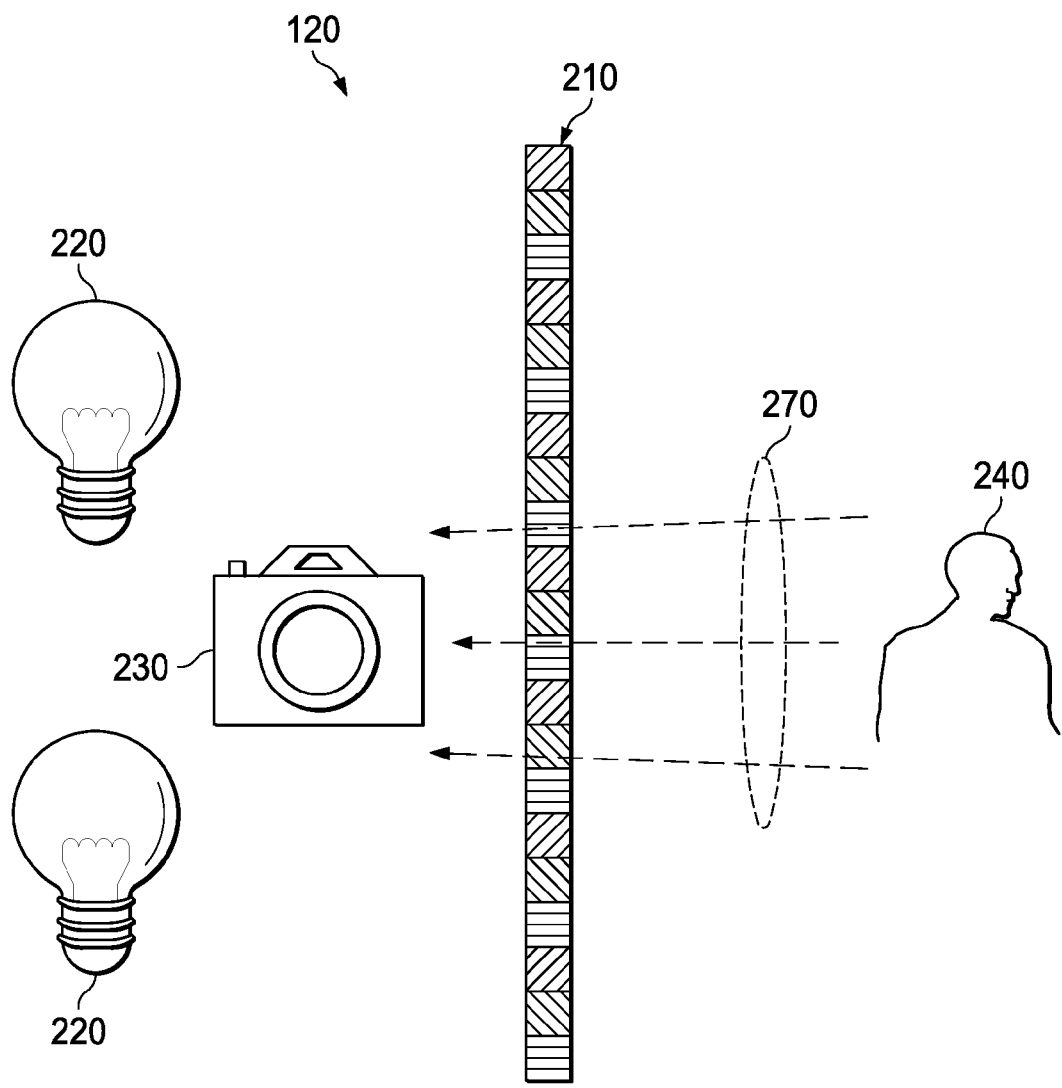
FIG. 2B is a schematic side elevational view of the first embodiment of FIG. 2A operating in an intermittent image acquisition mode.

In a videoconferencing terminal, establishing eye contact between the participants greatly enhances the feeling of intimacy. Unfortunately, the display and camera in many conventional videoconferencing terminals are not aligned. The resulting parallax prevents eye contact from being established.

Some videoconferencing terminals address the eye contact problem by using a large, tilted two way mirror to superimpose the camera position with the center of the display. Regrettably, this approach is bulky, frustrating the modern trend toward flat displays. Other videoconferencing terminals employ digital image-based rendering to recreate a central, eye contact view from multiple side views. One disadvantage of this approach is that it requires multiple cameras, significant image processing power and often yields unsuitable results.

Disclosed herein are various embodiments of a videoconferencing terminal in which the camera is placed behind a modified FPD, such as a liquid crystal display (LCD) such that the camera looks through the display at an object to be imaged (e.g., the participant in the videoconference). It is realized that an FPD is in essence an array of dimmable filters that can be manipulated (clarified or darkened).

With the benefit of various embodiments of the videoconferencing terminal described herein, it is possible for a videoconferencing participant to experience a feeling of intimacy in the videoconference.

FIG. 1 is a highly schematic block diagram of one embodiment of a videoconferencing infrastructure within which a videoconferencing terminal constructed according to the principles of the invention may operate. This embodiment of the videoconferencing infrastructure is centered about a telecommunications network 110 that is employed to interconnect two or more videoconferencing terminals 120, 130, 140, 150 for communication of video information, and perhaps also audio information, therebetween. An alternative embodiment of the videoconferencing infrastructure is centered about a computer network, such as the Internet. Still another embodiment of the videoconferencing infrastructure involves a direct connection between two videoconferencing terminals, e.g., the videoconferencing terminals 120, 130.

FIG. 2A is a schematic side elevational view of a first embodiment of a videoconferencing terminal, e.g., the videoconferencing terminal 120 of FIG. 1, constructed according to the principles of the invention and operating in an intermittent image display mode. The videoconferencing terminal 120 includes an FPD 210. In the illustrated embodiment, the FPD 210 includes an LCD. In an alternative embodiment, the FPD 210 includes a liquid-crystal-on-silicon (LCoS) display. In further alternative embodiments, the FPD 210 includes a plasma display or is based on another conventional or later-developed FPD technology. Those skilled in the pertinent art understand the structure and operation of conventional FPDs.

The FPD 210 is illustrated as having an unreferenced associated color filter array (CFA). In the embodiment of FIG. 2A, the CFA is integral with the FPD 210 such that filter elements of the FPD 210 are colored (e.g., red, green and blue arranged in, e.g., a Bayer pattern). Those skilled in the pertinent art understand the structure and operation of CFAs. In an alternative embodiment, the CFA is embodied in a layer adjacent to the FPD 210. In either embodiment, the CFA colors the pixels of the FPD 210, allowing the FPD 210 to display a color image. Various alternative embodiments of the videoconferencing terminal 120 lack the CFA and therefore employ the FPD 210 to provide a monochrome, greyscale, or "black-and-white," image.

A backlight 220 is associated with the FPD 210. The backlight 220 is located on a backside of the FPD 210 and is configured to illuminate the FPD 210 when brightened. Though FIG. 2A schematically represents the backlight 220 as including a pair of incandescent lamps, the backlight 220 more likely includes a cold-cathode fluorescent backlight lamp (CCFL). However, the backlight 220 may be of any conventional or later-developed type. Those skilled in the pertinent art understand the structure and operation of backlights.

A camera 230 is also associated with the FPD 210 and is also located on its backside. Though FIG. 2A only schematically represents the camera 230, the camera 230 takes the form of a charge-coupled device (CCD) solid-state camera equipped with a lens allowing it to capture an image from a focal plane that is beyond the FPD 210. Those skilled in the art will recognize that the camera 230 may be of any conventional or later-developed type whatsoever. Those skilled in the pertinent art also understand the structure and operation of cameras such as may be used in a videoconferencing terminal. The optical axis of the camera 230 faces (e.g., passes through a center of) the FPD 210. The camera 230 may be located at any distance from the FPD 210. However, in the illustrated embodiment, the camera 230 is located within 12 inches of the FPD 210. In an alternative embodiment, the camera 230 is located within four inches of the FPD 210.

An object 240 lies on the frontside of the FPD 210, i.e., the side of the FPD 210 that is opposite the backlight 220 and the camera 230. In the illustrated embodiment, the object 240 includes a face of a participant in a videoconference. However, the object 240 may be any object whatsoever.

The camera 230 is configured to receive light from an object 240 through the FPD 210 and acquire an image of the object 240. It should be noted that if a CFA is present, it will also filter (color) the light from the object 240. However, since the CFA is assumed to be capable of generating a substantially full color range and further to be substantially out of the image plane of the camera 230, its filter elements (e.g., red, green and blue) average out to yield substantially all colors.

As described above, FIG. 2A shows the first embodiment of the videoconferencing terminal 120 operating in an intermittent image display mode. In the image display mode, the operation of the FPD 210, the backlight 220 and the camera 230 is synchronized such that the FPD 210 displays information (e.g., including text, graphics or a picture for the benefit of the object 240, e.g., a picture of another videoconference participant) and the backlight 220 brightens such that the contrast of the image formed by the FPD 210 increases, rendering the information more legible. Arrows 250 signify light traveling from the backlight 220 to the FPD 210, and arrows 260 signify the light, now having traveled through the FPD 210 (and perhaps the CFA) and now bearing the information, traveling from the FPD 210 to the object 240. In the image display mode, the videoconferencing terminal 120 may act as a conventional FPD-type videoconferencing monitor.

FIG. 2B is a schematic side elevational view of the first embodiment of FIG. 2A operating in an intermittent image acquisition mode. In the intermittent image acquisition mode, the operation of the FPD 210, backlight 220 and camera 230 is synchronized such that the FPD 210 clarifies (becomes clearer), the backlight 220 darkens and the camera 230 is prompted to acquire an image (i.e., of the object 240). Arrows 270 signify light traveling from the object 240 through the FPD 210 (and perhaps the CFA) to the camera 230. Accordingly, a "shutter" of the camera 230 "opens" during which time a sample of the output of an array of CCDs in the camera 230 is taken and the image is thus acquired.

In the illustrated embodiment, the videoconferencing terminal is configured to alternate between the intermittent image display mode and the intermittent image acquisition mode at a video rate. In a more specific embodiment, the video rate is at least eight frames per second (fps). In a yet more specific embodiment, the video rate is at least 18 fps, and in a still more specific embodiment, the video rate is at least 24 fps. In fact, the video rate may be a full video rate or 30 fps, or even greater. Although various embodiments of the invention do not require it, alternating between the image display mode and the image acquisition mode at a video rate allows video images to be displayed for the benefit of the object 240 (e.g., a videoconference participant) and video images to be acquired for the benefit of a distant viewer (e.g., another videoconference participant).

In an alternative embodiment, the videoconferencing terminal 120 is a color terminal, but there is no CFA. Instead, the backlight 220 is configured to emit different colors (e.g., red, green and blue) during different occurrences of the image display mode. For example, in a first occurrence of the image display mode, if the backlight 220 emits red light, the FPD 110 may display corresponding information (e.g., the red component of a picture or frame). Then, in a second occurrence of the image display mode, if the backlight 220 emits green light, the FPD 110 may display corresponding information (e.g., the green component of the same picture or frame). Then, in a third occurrence of the image display mode, if the backlight 220 emits blue light, the FPD 110 may display corresponding information (e.g., the blue component of the same picture or frame). Finally, the first, second and third occurrences may be repeated for a subsequent picture. The videoconferencing terminal 120 may, of course, operate in intermittent image acquisition modes between these occurrences of the image display modes.

Figure 3:
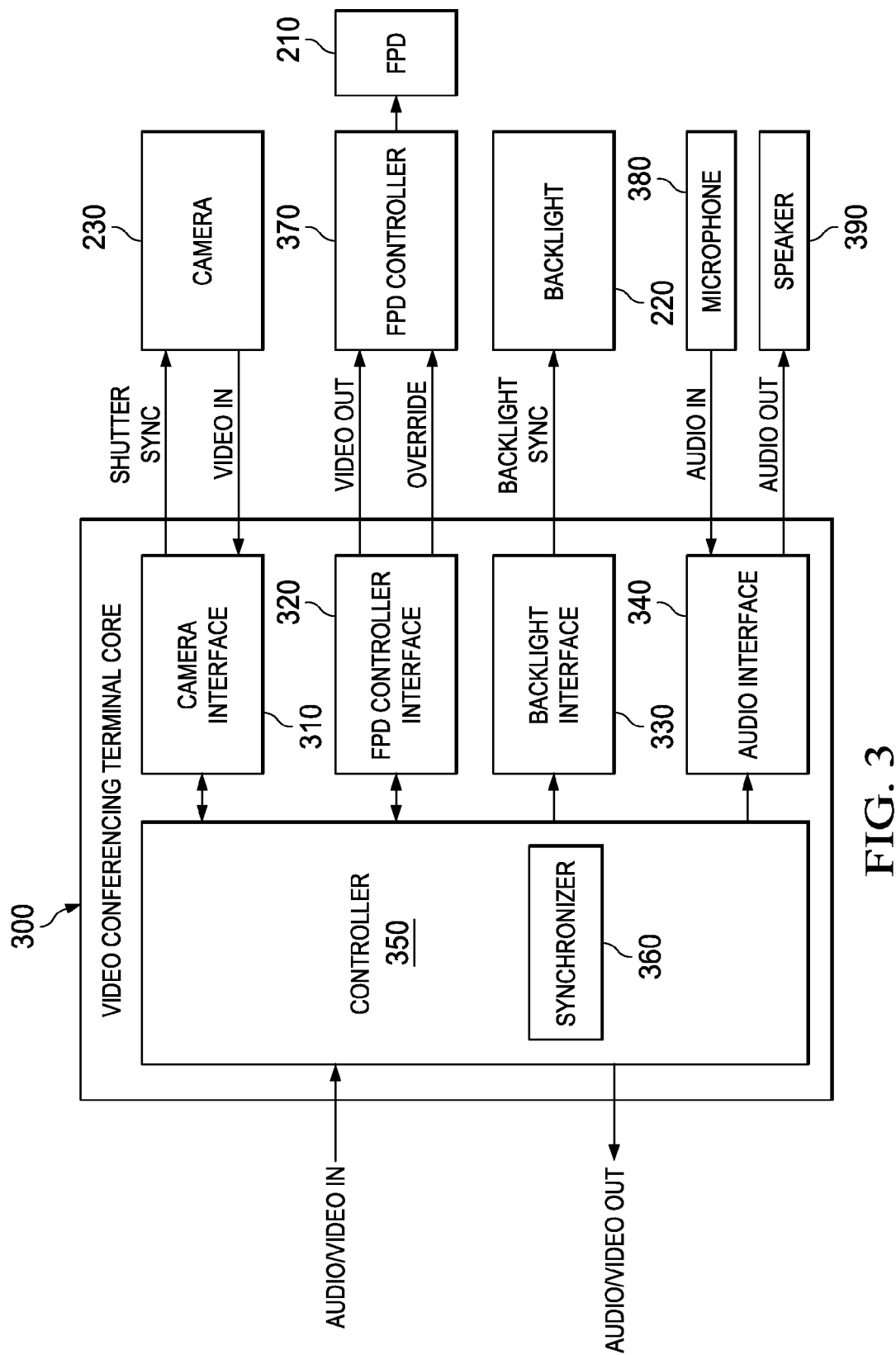
FIG. 3 is a block diagram of a system architecture of the first embodiment of FIGS. 2A and 2B.

FIG. 3 is a block diagram of a system architecture of the first embodiment of FIGS. 2A and 2B. The architecture includes a videoconferencing terminal core 300. The core 300 includes a camera interface 310, a FPD controller interface 320, an FPD backlight interface 330, an audio interface 340 and a controller 350. In the embodiment of FIG. 3, the controller 350 includes a synchronizer 360.

The camera interface 310 is coupled to the camera 230 and configured to provide a shutter sync signal to the camera 230 and receive a video in signal from the camera 230. The FPD controller interface 320 is coupled to an FPD controller 370 which is, in turn, coupled to the FPD 210. The FPD controller interface 320 is configured to provide a video out signal and an override signal to the FPD controller 370. The backlight interface 330 is coupled to the backlight 220 and configured to provide a backlight sync signal to the backlight 220.

The embodiment of FIGS. 2A, 2B and 3 is further capable of communicating audio information. Thus, the audio interface 340 is coupled to a microphone 380 and configured to receive an audio in signal from the microphone 380. The microphone 380 is configured to generate the audio in signal based on acoustic energy it receives. Likewise, the audio interface 340 is coupled to a speaker 390 and configured to provide an audio out signal to the speaker 390. The speaker 390 is configured to generate acoustic energy based on the audio out signal it receives. Those skilled in the pertinent art understand the structure and operation of microphones and speakers.

The synchronizer 360 is configured to control the FPD 210 (through the FPD controller 370), the backlight 220 and the camera 230 such that the videoconferencing terminal can operate in the intermittent image display mode in which the controller 350 causes the FPD 210 to display information and the backlight 220 to brighten. More specifically, in the embodiment of FIG. 3, the controller 350 is configured to employ the video out signal to provide the information to the FPD 210 via the FPD controller interface 320 and the FPD controller 370. The controller 350 is further configured to employ the backlight sync signal to cause the backlight 220 to brighten, perhaps by asserting the backlight sync signal. Those skilled in the pertinent art understand how backlights may be controlled.

The synchronizer 360 is further configured to control the FPD 210 (through the FPD controller 370), the backlight 220 and the camera 230 such that the videoconferencing terminal can operate in the intermittent image acquisition mode in which the controller 350 causes the FPD 210 to clarify, the backlight 220 to darken and the camera 230 to acquire the image of the object 240. In the embodiment of FIG. 3, the controller 350 is configured to employ the backlight sync signal to cause the backlight 220 to darken, perhaps by deasserting the backlight sync signal. The controller 350 is further configured to employ the override signal to cause the FPD 210 to ignore the video out signal and brighten instead. In the illustrated embodiment, the override signal causes substantially all of the pixels of the FPD 210 to display the color white (turn clear). The FPD controller 370 is further configured to employ the shutter sync signal to prompt the camera 230 to acquire an image, perhaps by briefly asserting the shutter sync signal. In response, the camera 230 acquires its image and provides it to the controller 350 via the video in signal and the camera interface 310.

During both of the image display mode and the image acquisition mode, it is assumed that the controller 350 employs the audio in signal to receive audio information from the microphone 380 and the audio out signal to provide audio information to the speaker 390 via the audio interface 340. In the embodiment of FIG. 3, the controller 350 is configured to combine the video in and audio in signals into an audio/video out signal to be delivered, for example, to the telecommunications network 110 of FIG. 1. Likewise, the controller 350 is configured to receive a combined audio/video in signal from, for example, the telecommunications network 110 of FIG. 1 and separate it to yield the video out and audio out signals.

Figure 4:
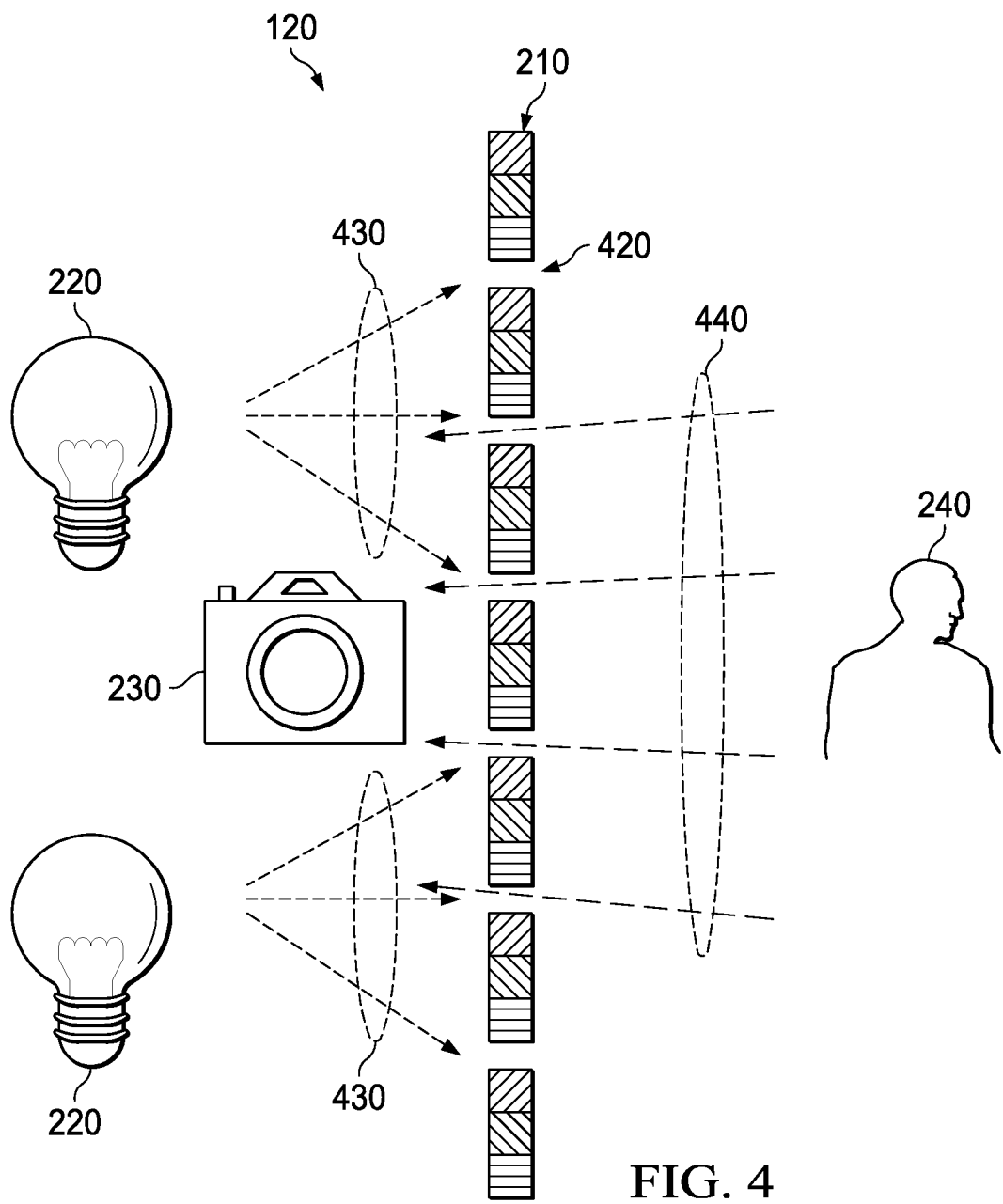
FIG. 4 is a schematic side elevational view of a second embodiment of a videoconferencing terminal constructed according to the principles of the invention and operating in concurrent image display and image acquisition modes.

FIG. 4 is a schematic side elevational view of a second embodiment of a videoconferencing terminal 120 constructed according to the principles of the invention and operating in concurrent image display and image acquisition modes. FIG. 4 shows the FPD 210, the backlight 220, the camera 230 and the object 240 as in FIGS. 2A and 2B.

However, unlike the FPD 210 of FIG. 2A, the FPD 210 of FIG. 4 includes substantially transparent regions 420 interspersed among its pixels. In the embodiment of FIG. 4, substantially no liquid crystal is located in the substantially transparent regions 420. In an alternative embodiment, liquid crystal is located in the substantially transparent regions 420, but the liquid crystal always remains substantially clear. In yet another alternative embodiment, the substantially transparent regions 420 are apertures extending entirely through the FPD 210.

In one embodiment, the camera 230 is configured to acquire its image substantially through only the substantially transparent regions 420. In another embodiment, the camera 230 is configured to acquire its image through both the substantially transparent regions 420 and the remainder of the FPD 210.

In the embodiment of FIG. 4, the backlight 200 operates continually, including while the camera 230 is acquiring one or more images. Accordingly, arrows 430 signify light traveling from the backlight 220 to the FPD 210 (and perhaps the CFA) and onward toward the object 240. Although FIG. 4 does not show such, a backside surface of the FPD 210 may be rough to scatter the light such that it does not create a glare in the lens of the camera 230. Arrows 440 signify light traveling from the object 240 through the FPD 210 (and perhaps the CFA) to the camera 230.

In the above-described embodiment in which the camera 230 is configured to acquire its image through both the substantially transparent regions 420 and the remainder of the FPD 210, the videoconferencing terminal employs the controller 350 of FIG. 3, that is, a controller that synchronizes the operation of the FPD 210, the backlight 220 and the camera 230.

Figure 5:
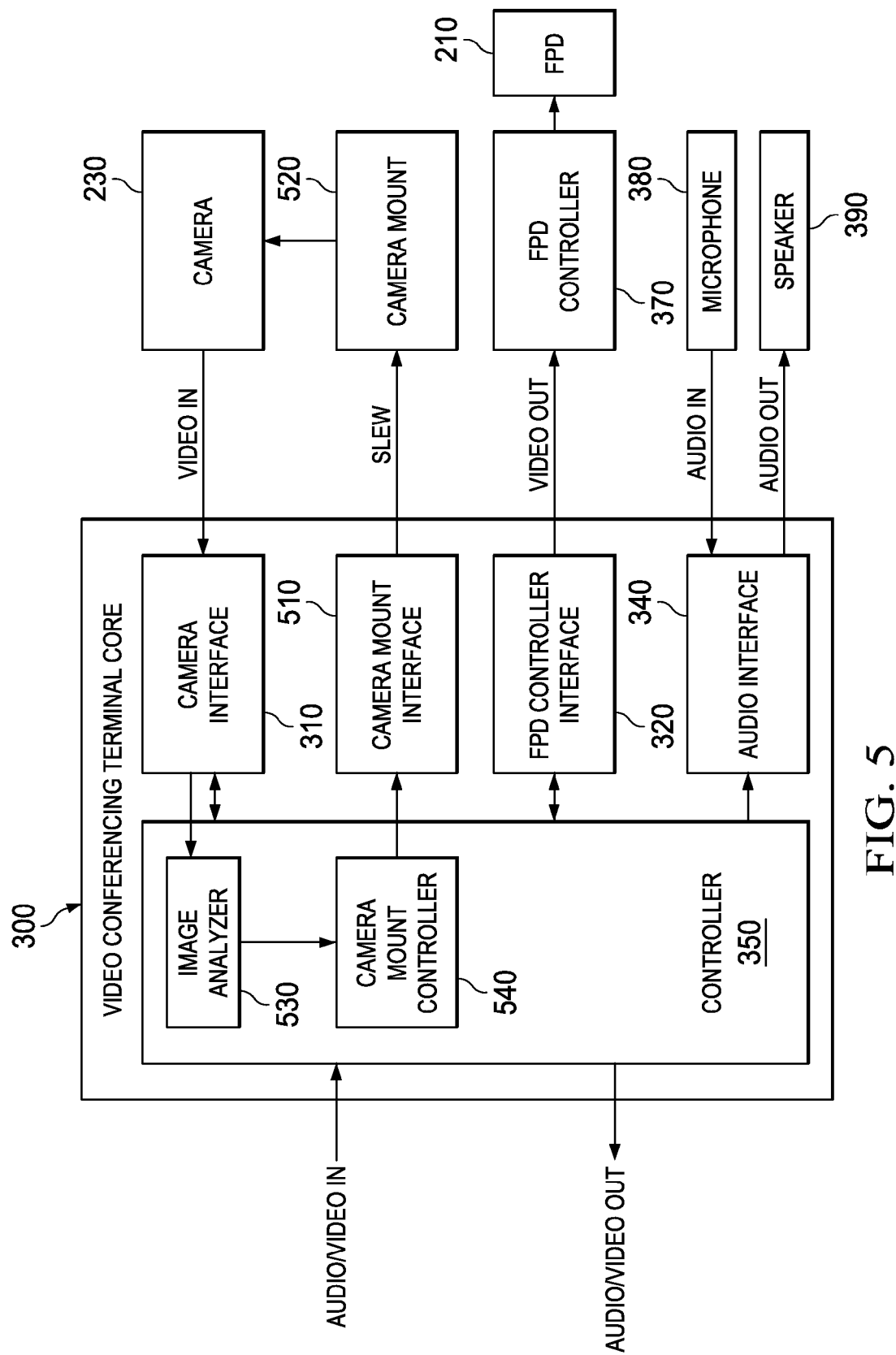
FIG. 5 is a block diagram of a third embodiment of a videoconferencing terminal constructed according to the principles of the invention.

FIG. 5 is a block diagram of a third embodiment of a videoconferencing terminal constructed according to the principles of the invention. In the third embodiment, the videoconferencing terminal core 300 is provided with a camera mount interface 510, and the camera 230 is provided with a controllable camera mount 520 coupled to the camera mount interface 510. Those skilled in the pertinent art understand the structure and operation of controllable camera mounts.

The controller 350 includes an image analyzer 530. The image analyzer 530 is configured to analyze the image that the camera 230 provides (via the video in signal) to determine a position of the object (e.g., the videoconference participant) relative to the camera 230. Those skilled in the pertinent art understand various conventional techniques for identifying objects or features in objects. The controller 350 also includes a camera mount controller 540 coupled to the image analyzer 530 and the camera mount 520. The camera mount controller 540 is configured to provide a slew signal to the camera mount 520 that is based on the position the image analyzer determines. The slew signal may cause the camera mount 520 to tilt, pan, zoom or shift the camera 230 as needed to, e.g., follow the whole object or any portion, e.g., the head or eyes, thereof. Those skilled in the pertinent art are aware of the manner in which controllable camera mounts are controlled by means of one or more slew signals.

Those skilled in the pertinent art will note that the third embodiment of the videoconferencing terminal lacks a backlight interface. This is due to the fact that the third embodiment is intended to operate with the FPD 210 of the second embodiment, namely one having transparent regions such that the backlight 220 of FIG. 4 can operate continually. For this reason, it will also be noted that the shutter sync and override signals of FIG. 3 are omitted. In a fourth embodiment, the videoconferencing terminal has a controllable camera mount but is otherwise configured to operate like the first embodiment, namely in the alternating intermittent image display mode and intermittent image acquisition mode. In the fourth embodiment, the controller 350 includes the synchronizer 360 of FIG. 3 and the image analyzer 530 and camera mount controller 540 of FIG. 5.

Figure 6:
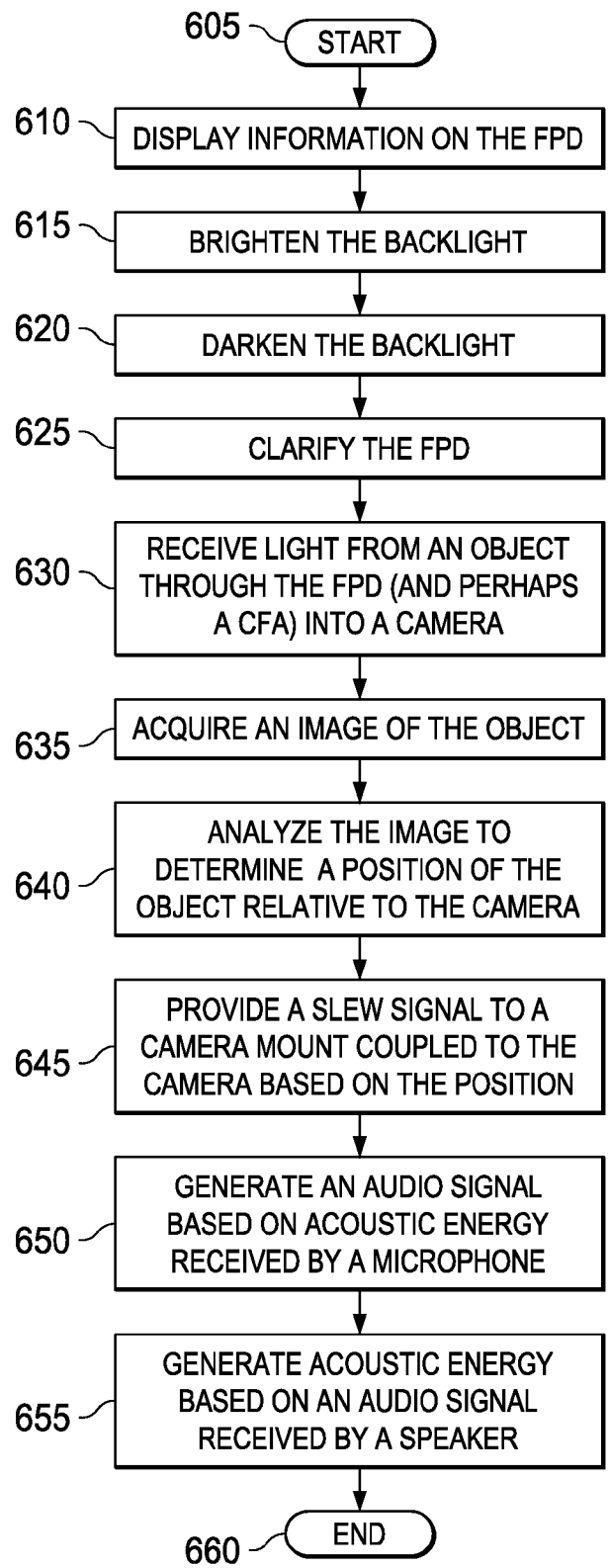
FIG. 6 is a flow diagram of one embodiment of a method of videoconferencing carried out according to the principles of the invention.

FIG. 6 is a flow diagram of one embodiment of a method of videoconferencing carried out according to the principles of the invention. The method begins in a start step 605. In a step 610, an intermittent image display mode is entered in which an FPD displays information. In a step 615, the intermittent image display mode continues with the brightening of a backlight associated with the FPD. The brightening of the backlight significantly enhances the visibility of the information to a viewer positioned in front of the FPD. In an alternative embodiment, the steps 610, 615 are performed in an opposite order.

In a step 620, the intermittent image acquisition mode is entered in which the backlight darkens. In a step 625, the intermittent image acquisition mode continues with the clarification of the FPD, rendering it substantially transparent. In an alternative embodiment, the steps 620, 625 are performed in an opposite order.

In an alternative embodiment, the steps 620, 625 are not carried out. Instead, the FPD includes substantially transparent regions interspersed among pixels thereof. This allows the image display mode and image acquisition mode to occur concurrently.

A camera may now acquire an image through the FPD. Accordingly, in a step 630, light from an object (such as the viewer) is received through the FPD into the camera. In a step 635, the camera acquires an image of the object. In the alternative embodiment described above, the light from the object is received substantially through only the transparent regions in the FPD into the camera, and the camera acquires the image substantially through only the transparent regions in the FPD.

In one embodiment, the steps 610, 615 (i.e., the intermittent image display mode) and the steps 620, 625 (i.e., the intermittent image acquisition mode) are alternated over time. In a more specific embodiment, the alternating of the modes occurs at a video rate (e.g., eight fps or greater) to yield a stream of images from the camera that are associated with one another to form a video stream.

In one embodiment, the camera is movable, allowing it to track the object. In this embodiment, a step 640, the image is analyzed to determine a position of the object relative to the camera. Also in this embodiment, a slew signal is provided to a camera mount coupled to the camera based on the position in a step 645.

In one embodiment, audio is communicated along with video. In this embodiment, a microphone generates an audio signal based on acoustic energy received thereby in a step 650. In a related embodiment, acoustic energy is generated based on an audio signal received thereby in a step 655. The method ends in an end step 660.

Those skilled in the art to which the invention relates will appreciate that other and further additions, deletions, substitutions and modifications may be made to the described embodiments without departing from the scope of the invention.

What is claimed is:

1. A videoconferencing terminal, comprising:
a flat panel liquid crystal display including substantially transparent regions interspersed among pixels of said flat panel display, wherein said pixels are controllably non-transparent and said substantially transparent regions have a fixed transparency;
a backlight associated with said flat panel display; and
a camera associated with said flat panel display and configured to receive light from an object through said flat panel display and acquire an image of said object.

2. The terminal as recited in claim 1 further comprising:
a controller coupled to said flat panel display, said backlight and said camera and includes a synchronizer configured to control said flat panel display, said backlight and said camera such that said videoconferencing terminal can operate in:
an intermittent image display mode in which said controller causes said flat panel display to display information and said backlight to brighten, and
an intermittent image acquisition mode in which said controller causes said flat panel display to clarify, said backlight to darken and said camera to acquire said image.

3. The terminal as recited in claim 2 wherein said controller is configured to alternate between said intermittent image display mode and said intermittent image acquisition mode at a video rate.

4. The terminal as recited in claim 2 further comprising a color filter array associated with said flat panel display, said camera configured to receive light from said object through said color filter array and said flat panel display.

5. The terminal as recited in claim 1 wherein said backlight is configured to emit different colors of light during different occurrences of said intermittent image acquisition mode.

6. The terminal as recited in claim 1 wherein said camera is configured to acquire said image substantially through only said substantially transparent regions.

7. The terminal as recited in claim 1 further comprising:
a camera mount coupled to said camera; and
a controller, including:
an image analyzer configured to analyze said image to determine a position of said object relative to said camera, and
a camera mount controller coupled to said image analyzer and said camera mount and configured to provide a slew signal to said camera mount based on said position.

8. The terminal as recited in claim 1 wherein said substantially transparent regions are distinct from each of said pixels.

9. The method as recited in claim 8 further comprising:
controlling said flat panel display, said backlight associated with said flat panel display and said camera such that said videoconferencing terminal can operate in:
an intermittent image display mode in which said flat panel display displays information and said backlight brightens, and
an intermittent image acquisition mode in which said flat panel display clarifies, said backlight darkens and said receiving and said acquiring are carried out.

10. The method as recited in claim 9 further comprising alternating between said intermittent image display mode and said intermittent image acquisition mode at a video rate.

11. The method as recited in claim 9 wherein said receiving comprises further receiving said light through said color filter array.

12. The method as recited in claim 9 further comprising causing said backlight to emit different colors of light during different occurrences of said intermittent image acquisition mode.

13. A method of videoconferencing, comprising:
employing a backlight to illuminate a flat panel liquid crystal display;
receiving light from an object through said flat panel display into a camera, said flat panel display including controllably non-transparent pixels and substantially transparent regions interspersed among said controllably non-transparent pixels, wherein said substantially transparent regions have a fixed transparency; and
acquiring an image of said object.

14. The method as recited in claim 13 wherein said acquiring comprises acquiring said image substantially through only said substantially transparent regions.

15. The method as recited in claim 13 further comprising:
analyzing said image to determine a position of said object relative to said camera; and
providing a slew signal to a camera mount coupled to said camera based on said position.

16. The method as recited in claim 13 further comprising:
generating an audio signal based on acoustic energy received by a microphone; and
generating acoustic energy based on an audio signal received by a speaker.

17. A videoconferencing infrastructure, comprising:
a plurality of videoconferencing terminals associable with a telecommunications network, at least one of said terminals including:
a flat panel liquid crystal display having substantially transparent regions interspersed among pixels thereof, wherein said pixels are controllably non-transparent and said substantially transparent regions are transparently fixed,
a camera associated with said flat panel display,
a microphone associated with said camera and configured to generate an audio signal based on acoustic energy received thereby,
a speaker associated with said camera and configured to generate acoustic energy based on an audio signal received thereby, and
a controller coupled to said flat panel display and said camera and configured to control said flat panel display and said camera to cause said camera to receive light from an object through said flat panel display and acquire an image of said object.

18. The infrastructure as recited in claim 17 wherein said backlight is configured to emit different colors of light during different occurrences of said intermittent image acquisition mode.

19. The infrastructure as recited in claim 17 wherein said at least one of said terminals further includes a backlight coupled to said controller and associated with said flat panel display, said controller including a synchronizer configured to control said flat panel display, said backlight and said camera such that said videoconferencing terminal can operate in:
an intermittent image display mode in which said controller causes said flat panel display to display information and said backlight to brighten, and
an intermittent image acquisition mode in which said controller causes said flat panel display to clarify, said backlight to darken and said camera to acquire said image.

20. The infrastructure as recited in claim 19 wherein said controller is configured to alternate between said intermittent image display mode and said intermittent image acquisition mode at a video rate.

21. The infrastructure as recited in claim 17 wherein said at least one of said terminals further includes a color filter array associated with said flat panel display, said camera configured to receive light from said object through said color filter array and said flat panel display.

22. The infrastructure as recited in claim 17 wherein said camera is configured to acquire said image substantially through only said substantially transparent regions.

23. The infrastructure as recited in claim 17 wherein said at least one of said terminals further includes:
a camera mount coupled to said camera, said controller including:
an image analyzer configured to analyze said image to determine a position of said object relative to said camera, and
a camera mount controller coupled to said image analyzer and said camera mount and configured to provide a slew signal to said camera mount based on said position.

* * * * *